United States Patent
Drissi et al.

(10) Patent No.: US 12,073,113 B2
(45) Date of Patent: Aug. 27, 2024

(54) DIRECT LOGICAL-TO-PHYSICAL ADDRESS MAPPING FOR SEQUENTIAL PHYSICAL ADDRESSES

(71) Applicant: Micron Technology, Inc., Boise, ID (US)

(72) Inventors: Lalla Fatima Drissi, Ottaviano (IT); Doriana Tardio, Salerno (IT); Giuseppe D'Eliseo, Caserta (IT); Giuseppe Ferrari, Naples (IT)

(73) Assignee: Micron Technology, Inc., Boise, ID (US)

( * ) Notice: Subject to any disclaimer, the term of this patent is extended or adjusted under 35 U.S.C. 154(b) by 122 days.

(21) Appl. No.: 17/461,469

(22) Filed: Aug. 30, 2021

(65) Prior Publication Data

US 2023/0068324 A1 Mar. 2, 2023

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
CPC ..... G06F 3/0659; G06F 3/0604; G06F 3/0679
See application file for complete search history.

(56) References Cited

U.S. PATENT DOCUMENTS

| | | | | |
|---|---|---|---|---|
| 6,671,791 B1* | 12/2003 | McGrath | ............. | G06F 12/1009 711/208 |
| 7,216,199 B2* | 5/2007 | Mizuno | ................. | G06F 3/0689 711/113 |
| 11,687,249 B2* | 6/2023 | Byun | .................... | G06F 3/0611 714/6.1 |
| 2008/0082596 A1* | 4/2008 | Gorobets | ............ | G06F 12/0253 |
| 2009/0193174 A1* | 7/2009 | Reid | ................... | G06F 12/0246 711/E12.001 |
| 2014/0043900 A1* | 2/2014 | Shimono | ................ | G11C 16/22 365/185.03 |
| 2015/0254135 A1* | 9/2015 | Chatradhi | ......... | H03M 13/3738 714/764 |
| 2021/0294527 A1* | 9/2021 | Aiba | ...................... | G06F 3/0679 |
| 2022/0244886 A1* | 8/2022 | Yang | ....................... | G06F 3/061 |

* cited by examiner

*Primary Examiner* — Charles Rones
*Assistant Examiner* — Alexander Vinnitsky
(74) *Attorney, Agent, or Firm* — Holland & Hart LLP

(57) ABSTRACT

Methods, systems, and devices for memory operations are described. A memory system may write data to sequential physical addresses of the memory system based on receiving multiple write commands, where the sequential physical addresses may be associated with sequential logical addresses. Based on writing the data, the memory system may receive a read command for data stored in the memory system, where the read command may include a logical address. The memory system may determine a physical address of the memory system where the data is stored based on the received logical address, a last logical address written at the memory system, and a sequence number group associated with the last logical address. Based on determining the physical address, the memory system may read the data stored at the physical address.

25 Claims, 7 Drawing Sheets

US 12,073,113 B2

DIRECT LOGICAL-TO-PHYSICAL ADDRESS MAPPING FOR SEQUENTIAL PHYSICAL ADDRESSES

FIELD OF TECHNOLOGY

The following relates generally to one or more systems for memory and more specifically to direct logical-to-physical address mapping.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

A memory system may use an L2P table to keep track of which logical addresses map to which physical addresses of the memory system. The memory system may store the L2P table in memory and may move portions of the L2P table into and out of a high-speed memory location (e.g., static random access memory (SRAM)) based on logical addresses referenced in commands received from a host system. Moving portions of the L2P table into and out of a high-speed memory location may increase latency associated with accessing information stored in a memory device. Also, moving the portions of the L2P table may increase the fatigue of locations in memory used to store the L2P table.

To decrease latency associated with determining L2P mappings and decrease the fatigue of memory used to store L2P mappings, a direct L2P approach may be used. A direct L2P approach may involve using information associated with accessing the memory system to determine a logical-to-physical mapping. In some examples, a memory system may write data to sequential physical addresses of the memory system based on receiving multiple write commands, where the sequential physical addresses may be associated with sequential logical addresses. Based on writing the data, the memory system may receive a read command for data stored in the memory system, where the read command may include a logical address. The memory system may determine a physical address of the memory system used to store the data is stored based on the received logical address, a last logical address written at the memory system, a sequence number group associated with the last logical address, and the sequential nature of the write operations. Based on determining the physical address, the memory system may read the data stored at the physical address.

Features of the disclosure are initially described in the context of a memory system. Features of the disclosure are also described in the context of a resource diagram, process flow, and operational diagram. These and other features of the disclosure are further illustrated by and described in the context of an apparatus diagram and flowchart that relate to direct logical-to-physical address mapping.

Figure 1:
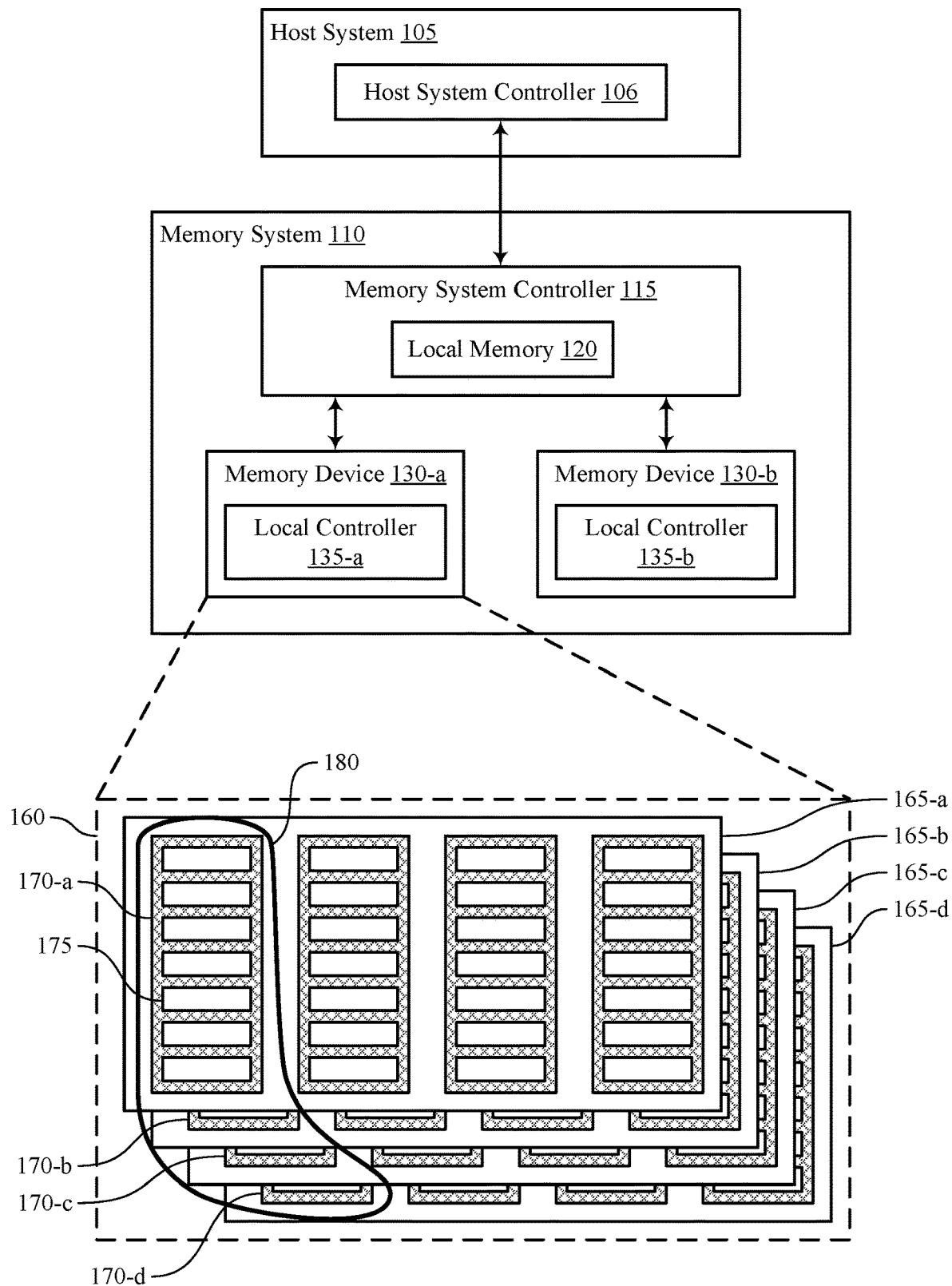
FIG. 1 illustrates an example of a system that supports direct logical-to-physical address mapping in accordance with examples as disclosed herein.

FIG. 1 illustrates an example of a system 100 that supports direct logical-to-physical address mapping in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165 c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

The system 100 may include any quantity of non-transitory computer readable media that support direct logical-to-physical address mapping. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

A memory system 110 may use an L2P table to keep track of which logical addresses map to which physical addresses of a memory device 130. The memory system 110 may also use a physical validity table to keep track of which pages 175 in a block 170 are storing valid information and which pages 175 in a block 170 are storing invalid information. The memory system 110 may constantly update the L2P and validity tables as data is written to a memory device 130.

The memory system 110 may use the L2P table to identify a location of data in a memory device 130 based on (e.g., in response to) receiving a request for the data from a host system 105. The request may include a request for data stored at a logical address, and the memory system may map the logical address to a physical address of the memory device 130 where the data is physically stored. The memory system 110 may use the L2P table to determine the mapping from the logical address to the physical address. In some examples, the memory system 110 loads portions of the L2P table into a high-speed memory location (e.g., SRAM)—e.g., if a size of the L2P table exceeds a size of the high-speed memory location. If the memory system 110 receives a logical address that is not currently referenced in a portion of the L2P table stored in the high-speed memory location, the memory system may load a portion of the L2P table that includes the logical address to determine the L2P mapping between the logical address and corresponding physical address.

Moving portions of the L2P table into and out of a high-speed memory location may increase latency associated with accessing information stored in a memory device. Also, moving the portions of the L2P table may increase the fatigue of locations in memory used to store the L2P table.

To decrease latency associated with determining L2P mappings and decrease the fatigue of memory used to store L2P mappings, a direct L2P approach may be used—e.g.,
when information is sequentially written to a memory device 130. A direct L2P approach may involve using information associated with accessing the memory system 110 to determine a logical-to-physical mapping. In some examples, a memory system 110 may write data to a memory device based on (e.g., in response to) receiving multiple write commands. The memory system 110 may write the data to sequential physical addresses of the memory device 130, where the sequential physical addresses may be associated with sequential logical addresses for the memory system 110. Based on (e.g., after) writing the data to the memory device 130, the memory system 110 may receive a request for the data stored in the memory device 130, where the request may include a logical address the corresponds to the physical address of the data. The memory system 110 may determine the physical address of the data based on the received logical address, a last logical address written to by the memory system 110, and a sequence number group associated with the last logical address. Based on determining the physical address, the memory system 110 may read the data set stored at the physical address in the memory device 130.

By using a direct L2P approach, operations for loading portions of an L2P table into a high-speed memory location may be avoided and a smaller amount of information may be used to determine mappings between logical and physical addresses.

Figure 2:
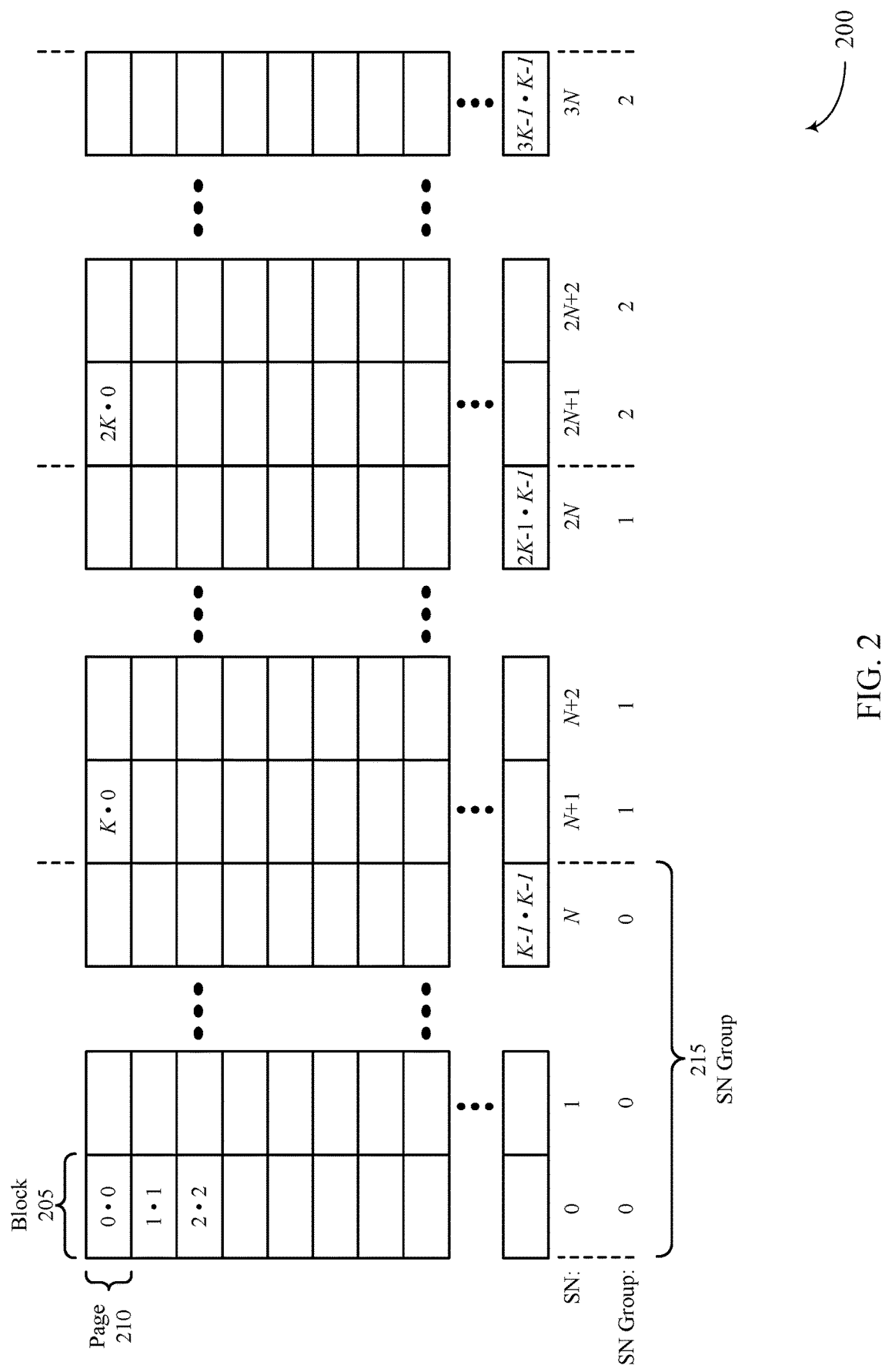
FIG. 2 illustrates an example of a resource diagram that supports direct logical-to-physical address mapping in accordance with examples as disclosed herein.

FIG. 2 illustrates an example of a resource diagram that supports direct logical-to-physical address mapping in accordance with examples as disclosed herein.

Resource diagram 200 depicts a partitioning of resources (e.g., physical resources) used to store data. Resource diagram 200 may include multiple blocks 205, where each block 205 may correspond to a column of resource diagram 200 and be associated with a sequence number. Also, each block 205 may be partitioned into multiple pages 210 where each page 210 of the block 205 may be associated with a physical address, and in some examples, a logical address. In some examples, up to K logical addresses (e.g., {0, 1 . . . K−1}) may be configured at a time.

Sets of the blocks 205 may be grouped together based on the quantity of logical addresses that may be configured. In some examples, a grouped set of blocks 205 may be formed so that the full set of logical addresses may be assigned across the pages 210 of the grouped set of blocks 205. The grouped sets of blocks 205 may be associated with a sequence number group 215.

When sequential write operations are performed, a memory system may use the arrangement of resource diagram 200 and information related to accessing the resources of resource diagram 200 (e.g., a last written LBA, a current sequence number, a current sequence number group, a quantity of configured logical addresses, etc.) to support direct L2P mapping techniques, as described in more detail herein.

Figure 3:
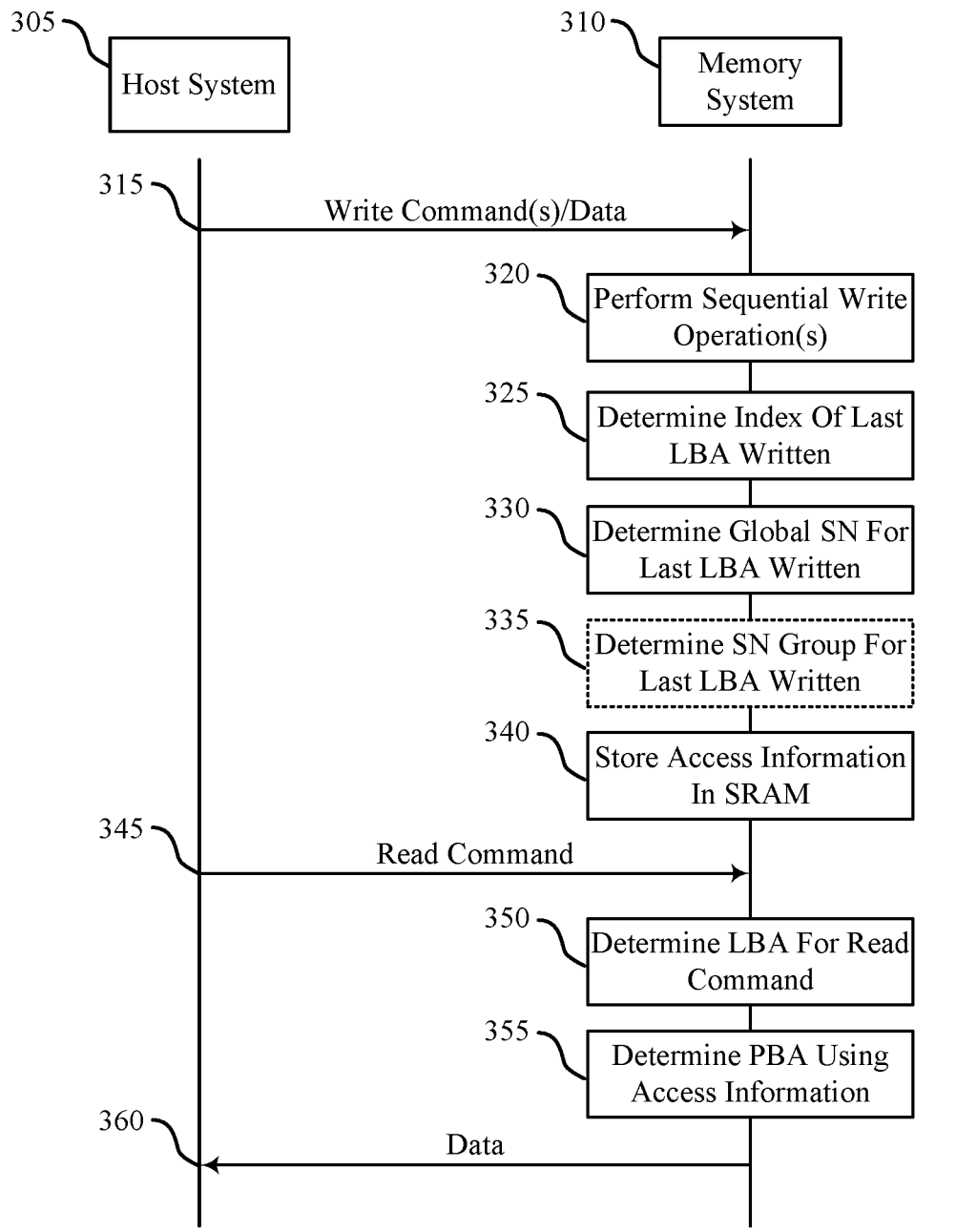
FIG. 3 illustrates an example of a process flow that supports direct logical-to-physical address mapping in accordance with examples as disclosed herein.

FIG. 3 illustrates an example of a process flow 300 that supports direct logical-to-physical address mapping in accordance with examples as disclosed herein.

Process flow 300 may be performed by host system 305 and memory system 310, which may be respective examples of a host system or memory system described above with reference to FIG. 1. In some examples, process flow 300 illustrates an exemplary sequence of operations performed to support direct logical-to-physical address mapping. For example, process flow 300 depicts operations for determining a physical address based on a received logical address and stored access information.

It is understood that one or more of the operations described in process flow 300 may be performed earlier or later in the process, omitted, replaced, supplemented, or combined with another operation. Also, additional operations described herein that are not included in process flow 300 may be included.

Aspects of the process flow 300 may be implemented by a controller, among other components. Additionally, or alternatively, aspects of the process flow 300 may be implemented as instructions stored in memory (e.g., firmware stored in a memory coupled with the host system 305 or firmware stored in a memory coupled with the memory system 310). For example, the instructions, when executed by a controller (e.g., at the host system 305), may cause the controller to perform the operations of the process flow 300.

At arrow 315, one or more write commands and corresponding data may transmitted by host system 305 and received by memory system 310. The one or more write commands may be used for writing the data to memory system 310. Host system 305 may also send the data to memory system 310. The one or more write commands may be used to perform a sequential write operation at memory system 310. In some examples, the one or more write commands address sequential logical addresses.

At block 320, one or more sequential write operations may be performed—e.g., by memory system 310. Memory system 310 may write the data associated with the one or more commands to sequential physical addresses at memory system 310. In some examples, memory system 310 may keep track of a quantity of logical addresses written to during a time period, where each instance of writing to a logical address may be referred to as an LBACopy.

At block 325, an index of a last logical address written by the memory system 310 (which may be referred to as LastLBA) may be determined. In some examples, after each write operation, memory system 310 may determine the logical address associated with the write operation. In some examples, memory system 310 may determine the logical address associated a last write operation in a series of write operations.

At block 330, a global sequence number (which may be referred to as GSN) may be determined for the last logical address written by the memory system 310. The global sequence number may be based on a position of a block (e.g., a block 205 of FIG. 2) within a set of blocks to which the data for the last logical address is written.

At block 335, a sequence number group may be determined based on the global sequence number and a quantity of blocks (represented by N) used to contain a full set of logical addresses. In some examples, the sequence number may be determined by dividing the global sequence number by the quantity of blocks used to contain the full set of logical addresses—e.g., when the quantity of logical addresses is equivalent to the quantity of pages (which may be represented by P or SizeBlockInLBA) supported by the blocks used to contain the full set of logical addresses. In some examples, the sequence number may be determined by determining the global sequence number, a quantity of logical addresses, and a quantity of pages included in the blocks—e.g., when the quantity of logical addresses is different than the quantity of pages supported by the blocks used to contain the full set of logical addresses.

At block 340, the access information (e.g., the last logical address written, the global sequence number, the sequence number group, or any combination thereof) may be stored by memory system 310. In some examples, memory system 310 stores the access information in an SRAM location.

At arrow 345, a read command may be transmitted by host system 305 and received by memory system 310. The read command may include a logical address where host system 305 expects the data to be stored, which may be referred to as LBAx.

At block 350, the logical address associated with the read command may be determined by memory system 310—e.g., based on processing the read command.

At block 355, the physical address storing the data previously written for the logical address may be determined. To determine the physical address, the memory system 310 may use the logical address received in the read command and the stored access information. In some examples, to determine the physical address, the memory system performs a set of operations used to implement the following statements:

$$\text{If } (LastLBA < LBAx)$$

$$LBACopy = (CurrentGroup - 1)K + LBAx$$

$$\text{Else}$$

$$LBACopy = (CurrentGroup) * K + LBAx$$

$$SNx = \frac{LBACopy}{SizeBlockInLBA}$$

$$LBAOffsetInSN = LBACopy \bmod SizeBlockInLBA$$

The If statement may be used to determine whether the index of the received logical address is greater than the last logical address written to by memory system 310. If the logical address is greater than the last logical address, then memory system 310 may determine that the data for the received logical address was written using blocks included in a previous sequence number group. Else, memory system 310 may determine that the data for the received logical address was written using blocks included in the current sequence number group. Memory system 310 may use this information to determine the instance when the data was written to the logical address (e.g., the LBACopy value).

Once the LBACopy value has been determined, memory system 310 may use the LBACopy value to determine a sequence number of the block where the data for the read command is stored as well as an offset within the block pointing to a page in the block where the data for the read command is stored. The offset may be determined based on a quantity of pages included in a block, where the quantity of pages may be associated with a quantity of logical addresses that may be associated with the block. Accordingly, memory system 310 may use the determined sequence number to determine the physical block in memory system 310 that stores the data for the received logical address and the determined offset to determine the physical page in the determined physical block that stores the data for the received logical address.

Using the stored access information to determine the physical address corresponding to the logical address (instead of an L2P table) may improve random read performance (e.g., by avoiding loading and reading the L2P table), sequential write performance (e.g., by avoiding updating a validity table), and can reduce table wear out (e.g., by avoiding moving an L2P table into and out of memory).

At arrow 360, the data stored at the determined physical address may be transmitted by memory system and received by host system 305.

Figure 4:
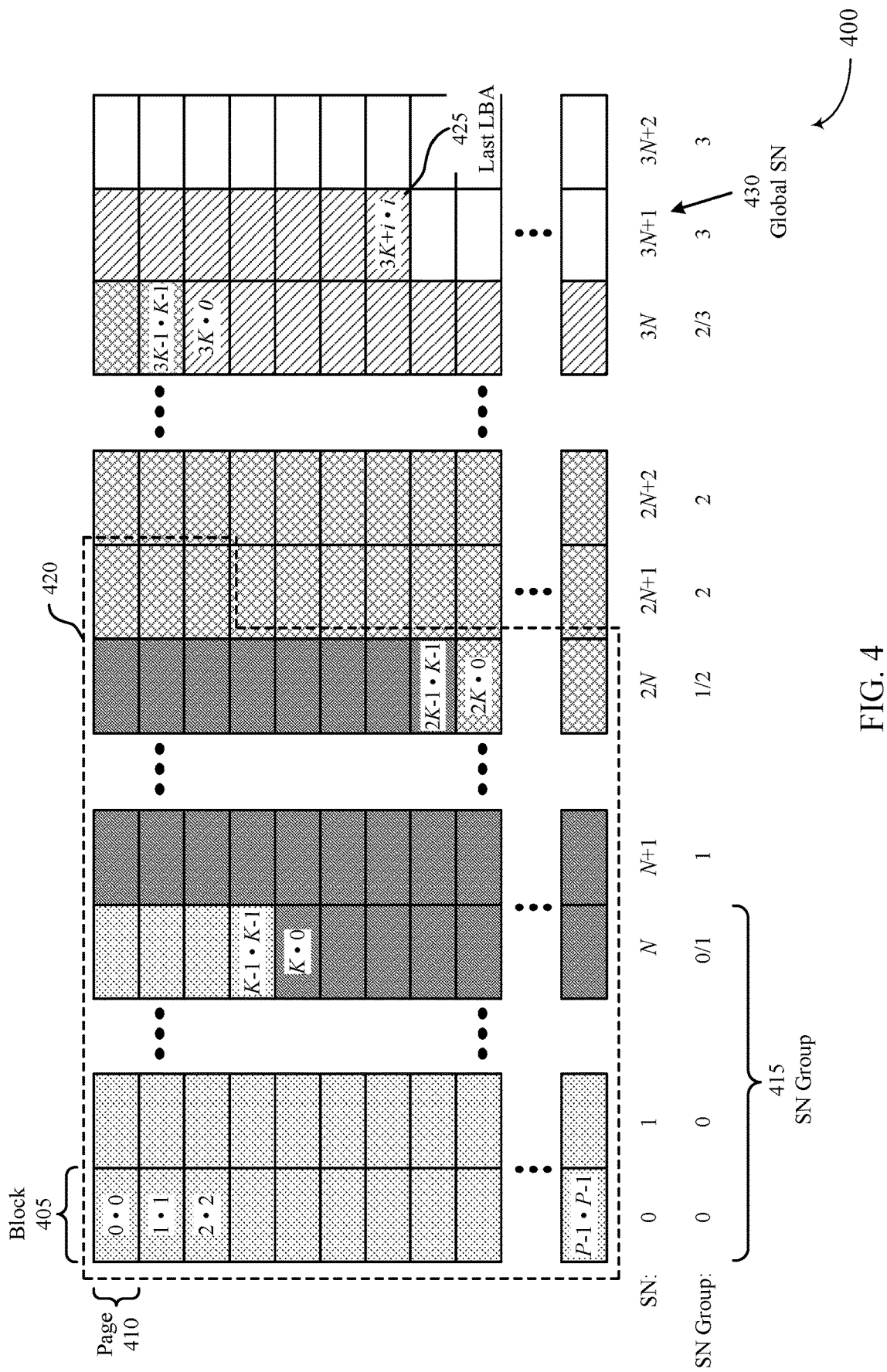
FIGS. 4 and 5 illustrate examples of operational diagrams that support direct logical-to-physical address mapping in accordance with examples as disclosed herein.

FIG. 4 illustrates an example of an operational diagram that supports direct logical-to-physical address mapping in accordance with examples as disclosed herein.

Resource diagram 400 depicts a set of resources as data is being written to the set of resources. In some examples, a direct L2P table is generated based on writing the data to the set of resources, where the direct L2P table may be constructed similarly as the set of resources—e.g., the first column of the table may correspond to a first block, the entries of a column may correspond to pages 410 in a block 405, and so on. Also, the entries of a column may include a LBACopy value as well as a written LBA value.

In some examples and as shown in FIG. 4, a last address of the quantity of logical addresses (which may be represented by K) may map to a portion of a block 405. In such cases, a repeated set of the logical addresses may begin in a non-zero starting point (e.g., a middle) of a block. In such cases, the calculation of the sequence number group 415 for which a logical address is associated may involve determine a starting location of each sequence number group 415—e.g., instead of dividing the sequence associated with a logical address by the quantity of blocks 405 used to contain the set of logical addresses.

A memory system may write data to a set of logical addresses supported by the memory system. During a first duration, the memory system may write a first set of data to the set of logical address. The data for the first logical address (e.g., LBA_0) of the first set of data may be written to the first block and the first page of resource diagram 400. In some examples, the index of the first logical address and the index of the write operation instance (which may be represented by LBACopy_0) may be associated with the first block and first page of resource diagram 400. These indices (LBACopy_0·LBA_0) may be entered into a first entry of a direct L2P table. As additional data is written to the subsequent blocks 405 and pages 410 of resource diagram 400, similar indices may be similarly written to the subsequent blocks 405 and pages 410 of resource diagram 400.

Once all of the logical address in the set of logical addresses have been written to, a second set of data may be written to the set of logical address, starting at the beginning. The data for the first logical address (e.g., LBA_0) of the second set of data may be written to the fifth page of the Nth block of resource diagram 400. In some examples, the index of the first logical address and the index of the write operation instance (which may be represented by LBACopy K) may be associated with the fifth page of the Nth block of resource diagram 400. These indices (LBACopy_0·LBA_0) may be entered into an entry of the direct L2P table corresponding to the Nth column and the fifth row of the direct L2P table.

The memory system may continue to write sets of data to the resources of resource diagram 400 and update the direct L2P table as write commands are received from a host system. A last set of data written by the memory system may include data written for last LBA 425, where last LBA 425 may be associated with the (3K+i)th write operation and the index (i) of the last logical address written at the memory system. These indices (LBACopy_(3K+i)·LBA_i) may be entered into an entry of the direct L2P table corresponding to the (3N+i)th column and the ith row of the direct L2P table. In some examples, previous sets of data written to the memory system may become invalid—e.g., the data encircled by box 420 may be invalid by the time the data for last LBA 425 is written. Box 420 may encapsulate data in previous sets of data that are associated with lower logical addresses than last LBA 425.

Global sequence number 430 may be equivalent to the sequence number associated with last LBA 425. That is, global sequence number 430 may be equivalent to the sequence number of the block that is currently being written to by the memory system. Also, the sequence number group associated with last LBA 425 may be determined based on global sequence number 430 (e.g., the sequence number group may be equivalent to SNGroup_3).

The memory system may receive a read command, which may include a logical address (which may be referred to as LBAx) associated with a set of data requested by the read command. Based on (e.g., in response to) receiving the read command, the memory system may determine a physical location (e.g., the physical address) of the data previously stored for the logical address. The memory system may use the direct L2P table to determine the physical location of the data. For example, the memory system may determine a current sequence number group associated with last LBA 425. The memory system may determine the current sequence number group based on global sequence number 430, the quantity of block 405s used to contain the set of logical addresses (e.g., which may be represented by N), the quantity of logical addresses included in the set of logical addresses (e.g., which may be represented by K), and the quantity of pages 410 included in a block 405. In examples where the quantity of logical addresses in the set of logical address is a multiple of the quantity of pages 410 (which may be represented by P or SizeBlockInLBA) in a block, the memory system may determine the current sequence number group based on global sequence number 430, the quantity of blocks used to contain the set of logical addresses (e.g., which may be represented by N)—e.g., by dividing the value of global sequence number 430 (which may be represented by GSN) by the value of N. Otherwise, the memory system may use the relationship between the quantity of blocks used to contain the set of logical addresses (e.g., which may be represented by N), the quantity of logical addresses included in the set of logical addresses (e.g., which may be represented by K), and the quantity of pages 410 included in a block 405 to determine starting points for each sequence number group.

Based on (e.g., after) determining the current sequence number group, the memory system may determine whether the value of last LBA 425 is less than the value of LBAx. If the value of last LBA 425 is less than the value of LBAx, the memory system may determine that LBAx was written in a prior sequence number group (e.g., SNGroup_2). Based on determining that LBAx was written in the prior sequence number group, the memory system may determine the write operation instance (e.g., the LBACopy) used to write data for LBAx—e.g., by multiplying the value of the prior sequence number group by K and adding the value of LBAx, as represented by LBACopy=(CurrentSNGroup−1)*K+LBAx.

If the value of last LBA 425 is greater than or equal to the value of LBAx, the memory system may determine that LBAx was written in the current sequence number group (e.g., SNGroup_3). Based on determining that LBAx was written in the current sequence number group, the memory system may determine the write operation instance (e.g., the LBACopy) used to write data for LBAx—e.g., by multiplying the value of the current sequence number group by K and adding the value of LBAx, as represented by LBACopy=(CurrentSNGroup)*K+LBAx.

Based on (e.g., after) determining the writing instance for the received logical address, the memory system may determine the sequence number that corresponds to the received logical address (which may be represented by SNx)—e.g., by dividing the value of LBACopy by the quantity of pages 410 in a block 405), as represented by $$SNx = \frac{LBACopy}{SizeBlockInLBA}.$$

The memory system may also determine an offset in the block corresponding to the determine sequence number (which may be represented by LBAOffsetInSN)—e.g., by taking LBACopy modulo SizeBlockInLBA, as represented by LBAOffsetInSNx=LBACopy mod SizeBlockInLBA.

Based on (e.g., after) determining the block (SNx) associated with the received logical address (LBAx) and the offset (LBAOffsetInSNx) within the determined block, the memory system may determine a physical address where the data for the logical address is stored. Accordingly, the memory system may access the data stored in the block (SNx) and the page corresponding to the offset (LBAOffsetInSNx) and output the data to the host system.

Figure 5:
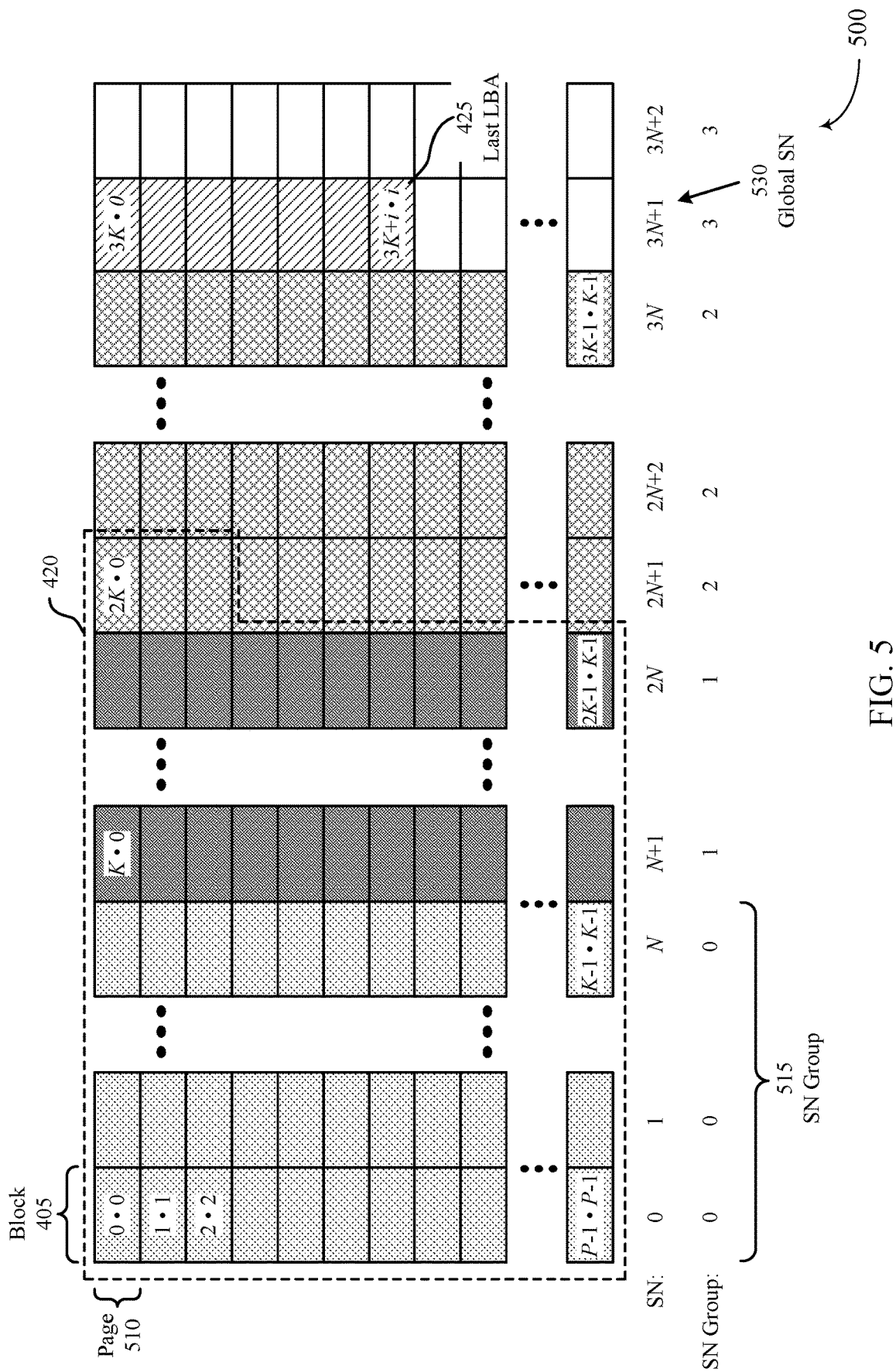
Figure 6:
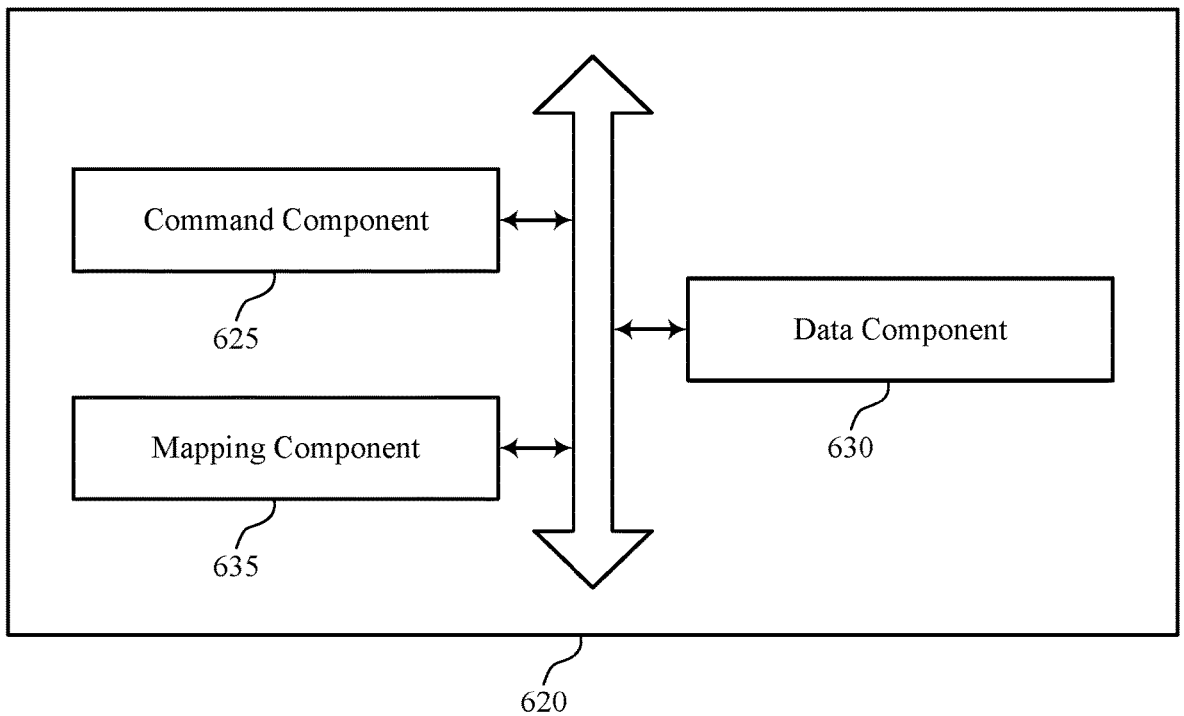
FIG. 6 shows a block diagram of a memory system that supports direct logical-to-physical address mapping in accordance with examples as disclosed herein.

FIG. 5 illustrates an example of an operational diagram that supports direct logical-to-physical address mapping in accordance with examples as disclosed herein. Resource diagram 500 depicts a set of resources as data is being written to the set of resources. Resource diagram may be an example of resource diagram 400 of FIG. 4. In the example of FIG. 5, the quantity of logical addresses (which may be represented as K) in the set of logical addresses may be equivalent to the quantity of pages 510 in a set of blocks used to contain the set of logical addresses. In such cases, the sequence number group 515 associated with a logical address may be obtained by dividing the global SN 530 by the quantity of blocks (which may be represented as N) that makes up a set of blocks used to contain the set of logical addresses FIG. 6 shows a block diagram 600 of a memory system 620 that supports direct logical-to-physical address mapping in accordance with examples as disclosed herein. The memory system 620 may be an example of aspects of a memory system as described with reference to FIGS. 1 through 4. The memory system 620, or various components thereof, may be an example of means for performing various aspects of direct logical-to-physical address mapping as described herein. For example, the memory system 620 may include a command component 625, a data component 630, a mapping component 635, or any combination thereof. Each of these components may communicate, directly or indirectly, with one another (e.g., via one or more buses).

The command component 625 may be configured as or otherwise support a means for receiving a plurality of write commands for writing a plurality of data sets to a memory system. The data component 630 may be configured as or otherwise support a means for writing, based at least in part on the plurality of write commands, the plurality of data sets to sequential physical addresses of the memory system that are associated with sequential logical addresses of the memory system. In some examples, the command component 625 may be configured as or otherwise support a means for receiving, based at least in part on writing the plurality of data sets to the sequential physical addresses, a read command for a data set of the plurality of data sets from a logical address of the sequential logical addresses. The mapping component 635 may be configured as or otherwise support a means for determining a physical address of the data set based at least in part on the logical address of the data set, a logical address of a last data set written at the memory system, and a sequence number group associated with the last data set written at the memory system. In some examples, the data component 630 may be configured as or otherwise support a means for reading, based at least in part on the determining, the data set from the physical address of the memory system.

In some examples, to support determining the physical address of the data set, the mapping component 635 may be configured as or otherwise support a means for determining, based at least in part on the logical address and the sequence number group of the last data set written at the memory system, a sequence number associated with the logical address of the data set and associated with a corresponding block of the memory system. In some examples, to support determining the physical address of the data set, the mapping component 635 may be configured as or otherwise support a means for determining, for the sequence number, an offset associated with the logical address of the data set and associated with a corresponding portion of the corresponding block that corresponds to the physical address of the data set.

In some examples, the mapping component 635 may be configured as or otherwise support a means for determining, based at least in part receiving the read command, the logical address of the last data set written at the memory system and a sequence number associated with the last data set written at the memory system. In some examples, the mapping component 635 may be configured as or otherwise support a means for determining the sequence number group associated with the last data set written at the memory system based at least in part on the sequence number associated with the last data set written at the memory system and a quantity of the sequential logical addresses.

In some examples, to support determining the sequence number group associated with the last data set written at the memory system, the mapping component 635 may be configured as or otherwise support a means for determining a quantity of blocks of the memory system for storing data for the sequential logical addresses based at least in part on a size of the blocks and the quantity of the sequential logical addresses, where the sequence number group associated with the last data set written at the memory system is based at least in part on a result of dividing the sequence number associated with the last data set written at the memory system by the quantity of the blocks.

In some examples, to support writing the plurality of data sets, the data component 630 may be configured as or otherwise support a means for writing first data sets of the plurality of data sets to first sequential physical addresses of the sequential physical addresses that are associated with the sequential logical addresses of the memory system and the sequence number group. In some examples, to support writing the plurality of data sets, the data component 630 may be configured as or otherwise support a means for writing, before the first data sets, second data sets of the plurality of data sets to preceding sequential physical addresses of the sequential physical addresses that are associated with an overlapping portion of the sequential logical addresses of the memory system and a preceding sequence number group.

In some examples, to support determining the physical address of the data set, the mapping component 635 may be configured as or otherwise support a means for determining whether the logical address of the data set is associated with the first sequential physical addresses or the preceding sequential physical addresses based at least in part on the logical address of the data set and the logical address of the last data set written at the memory system.

In some examples, to support determining whether the logical address of the data set is associated with the first sequential physical addresses or the preceding sequential physical addresses, the mapping component 635 may be configured as or otherwise support a means for determining that the logical address of the data set is associated with the first sequential physical addresses based at least in part on the logical address of the data set being smaller than the logical address of the last data set written at the memory system. In some examples, to support determining whether the logical address of the data set is associated with the first sequential physical addresses or the preceding sequential physical addresses, the mapping component 635 may be configured as or otherwise support a means for determining that the logical address of the data set is associated with the preceding sequential physical addresses based at least in part on the logical address of the data set being larger than the logical address of the last data set written at the memory system.

In some examples, to support determining the physical address of the data set, the mapping component 635 may be configured as or otherwise support a means for determining a block associated with the logical address of the data set based at least in part on determining that the logical address of the data set is associated with the preceding sequential physical addresses. In some examples, to support determining the physical address of the data set, the mapping component 635 may be configured as or otherwise support a means for determining an offset within the block associated with a portion of the block that corresponds to the logical address of the data set.

In some examples, to support determining the physical address of the data set, the mapping component 635 may be configured as or otherwise support a means for determining, based at least in part on determining that the logical address of the data set is associated with the first sequential physical addresses, a position of a prior write operation for the data set within a sequence of write operations for the plurality of data sets based at least in part on the sequence number group, a quantity of the sequential logical addresses, and the logical address of the data set. In some examples, to support determining the physical address of the data set, the mapping component 635 may be configured as or otherwise support a means for determining, based at least in part on determining that the logical address of the data set is associated with the preceding sequential physical addresses, the position of a prior write operation for the data set within the sequence of write operations for the plurality of data sets based at least in part on the preceding sequence number group, the quantity of the sequential logical addresses, and the logical address of the data set.

In some examples, to support determining the physical address of the data set, the mapping component 635 may be configured as or otherwise support a means for determining a sequence number associated with the logical address of the data set based at least in part on a result of dividing the position of the prior write operation for the data set by a size of blocks of the memory system, the sequence number associated with a corresponding block of the memory system. In some examples, to support determining the physical address of the data set, the mapping component 635 may be configured as or otherwise support a means for determining, for the sequence number, an offset associated with the logical address of the data set based at least in part on a remainder resulting from dividing the position of the prior write operation for the data set by the size of the blocks of the memory system, the offset associated with a corresponding portion of the corresponding block that corresponds to the physical address of the data set.

In some examples, the mapping component 635 may be configured as or otherwise support a means for generating, based at least in part on writing the respective portions of the plurality of data sets to the respective portions of the sequential physical addresses, respective sets of entries of a mapping corresponding to the respective portions of the sequential physical addresses.

In some examples, the respective sets of entries are associated with consecutive sets of the sequential logical addresses and respective blocks of the memory system, consecutive entries of the respective sets of entries are associated with consecutive logical addresses of the sequential logical addresses, and each entry of the respective sets of entries is associated with a position of a write operation for a respective data set within a sequence of write operations for the plurality of data sets.

In some examples, the plurality of data sets is stored in a first memory including not-AND memory cells.

In some examples, the physical address of the data set is determined without using a physical page table.

In some examples, the sequence number group includes a group of blocks of the memory system sufficient to store respective data sets for each of the sequential logical addresses.

Figure 7:
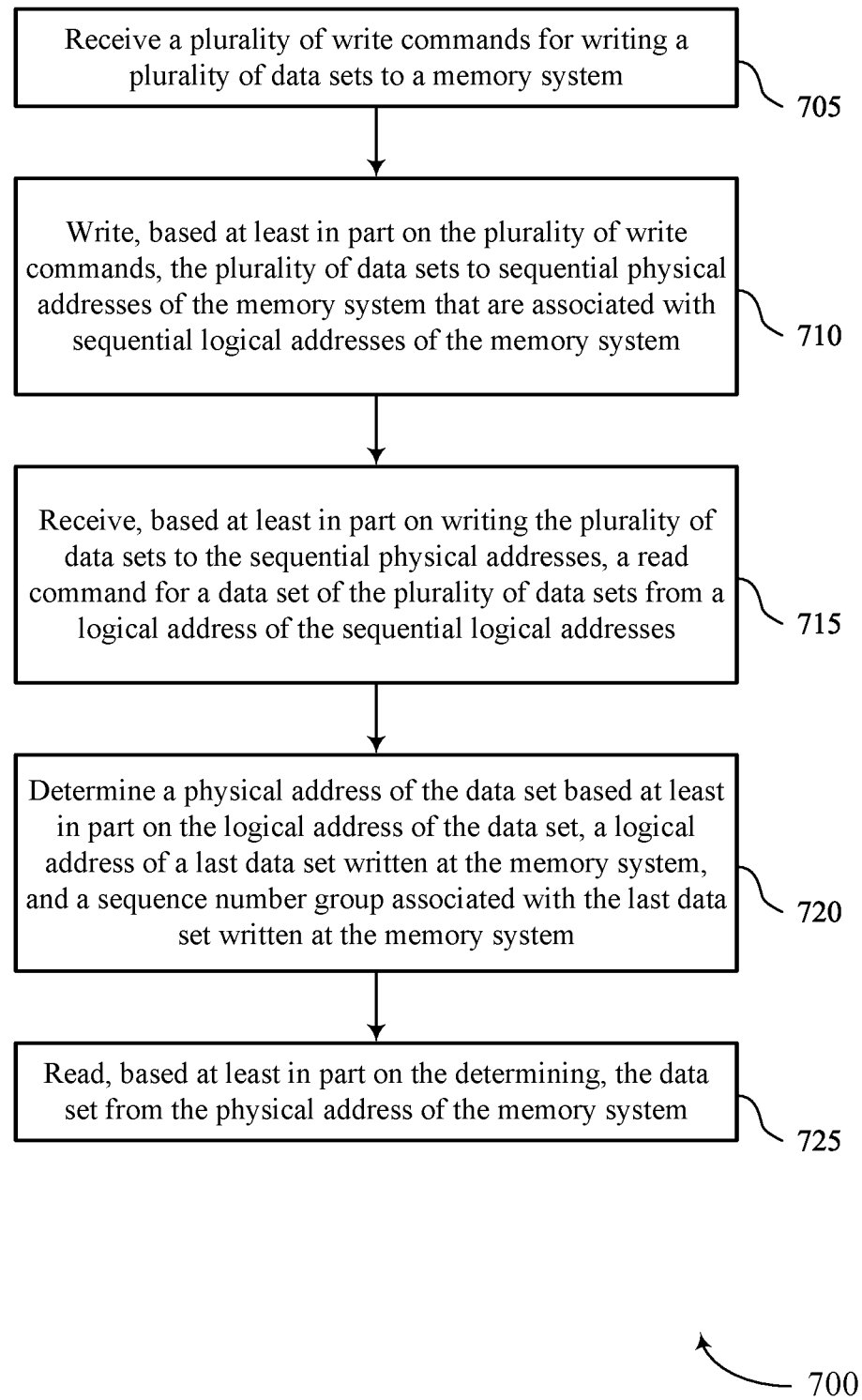
FIG. 7 shows a flowchart illustrating a method or methods that support direct logical-to-physical address mapping in accordance with examples as disclosed herein.

FIG. 7 shows a flowchart illustrating a method 700 that supports direct logical-to-physical address mapping in accordance with examples as disclosed herein. The operations of method 700 may be implemented by a memory system or its components as described herein. For example, the operations of method 700 may be performed by a memory system as described with reference to FIGS. 1 through 6. In some examples, a memory system may execute a set of instructions to control the functional elements of the device to perform the described functions. Additionally, or alternatively, the memory system may perform aspects of the described functions using special-purpose hardware.

At 705, the method may include receiving a plurality of write commands for writing a plurality of data sets to a memory system. The operations of 705 may be performed in accordance with examples as disclosed herein. In some examples, aspects of the operations of 705 may be performed by a command component 625 as described with reference to FIG. 6.

At 710, the method may include writing, based at least in part on the plurality of write commands, the plurality of data sets to sequential physical addresses of the memory system that are associated with sequential logical addresses of the memory system. The operations of 710 may be performed in accordance with examples as disclosed herein. In some examples, aspects of the operations of 710 may be performed by a data component 630 as described with reference to FIG. 6.

At 715, the method may include receiving, based at least in part on writing the plurality of data sets to the sequential physical addresses, a read command for a data set of the plurality of data sets from a logical address of the sequential logical addresses. The operations of 715 may be performed in accordance with examples as disclosed herein. In some examples, aspects of the operations of 715 may be performed by a command component 625 as described with reference to FIG. 6.

At 720, the method may include determining a physical address of the data set based at least in part on the logical address of the data set, a logical address of a last data set written at the memory system, and a sequence number group associated with the last data set written at the memory system. The operations of 720 may be performed in accordance with examples as disclosed herein. In some examples, aspects of the operations of 720 may be performed by a mapping component 635 as described with reference to FIG. 6.

At 725, the method may include reading, based at least in part on the determining, the data set from the physical address of the memory system. The operations of 725 may be performed in accordance with examples as disclosed herein. In some examples, aspects of the operations of 725 may be performed by a data component 630 as described with reference to FIG. 6.

In some examples, an apparatus as described herein may perform a method or methods, such as the method 700. The apparatus may include, features, circuitry, logic, means, or instructions (e.g., a non-transitory computer-readable medium storing instructions executable by a processor) for receiving a plurality of write commands for writing a plurality of data sets to a memory system, writing, based at least in part on the plurality of write commands, the plurality of data sets to sequential physical addresses of the memory system that are associated with sequential logical addresses of the memory system, receiving, based at least in part on writing the plurality of data sets to the sequential physical addresses, a read command for a data set of the plurality of data sets from a logical address of the sequential logical addresses, determining a physical address of the data set based at least in part on the logical address of the data set, a logical address of a last data set written at the memory system, and a sequence number group associated with the last data set written at the memory system, and reading, based at least in part on the determining, the data set from the physical address of the memory system.

In some examples of the method 700 and the apparatus described herein, determining the physical address of the data set may include operations, features, circuitry, logic, means, or instructions for determining, based at least in part on the logical address and the sequence number group of the last data set written at the memory system, a sequence number associated with the logical address of the data set and associated with a corresponding block of the memory system and determining, for the sequence number, an offset associated with the logical address of the data set and associated with a corresponding portion of the corresponding block that corresponds to the physical address of the data set.

Some examples of the method 700 and the apparatus described herein may further include operations, features, circuitry, logic, means, or instructions for determining, based at least in part receiving the read command, the logical address of the last data set written at the memory system and a sequence number associated with the last data set written at the memory system and determining the sequence number group associated with the last data set written at the memory system based at least in part on the sequence number associated with the last data set written at the memory system and a quantity of the sequential logical addresses.

In some examples of the method 700 and the apparatus described herein, determining the sequence number group associated with the last data set written at the memory system may include operations, features, circuitry, logic, means, or instructions for determining a quantity of blocks of the memory system for storing data for the sequential logical addresses based at least in part on a size of the blocks and the quantity of the sequential logical addresses, where the sequence number group associated with the last data set written at the memory system may be based at least in part on a result of dividing the sequence number associated with the last data set written at the memory system by the quantity of the blocks.

In some examples of the method 700 and the apparatus described herein, writing the plurality of data sets may include operations, features, circuitry, logic, means, or instructions for writing first data sets of the plurality of data sets to first sequential physical addresses of the sequential physical addresses that may be associated with the sequential logical addresses of the memory system and the sequence number group and writing, before the first data sets, second data sets of the plurality of data sets to preceding sequential physical addresses of the sequential physical addresses that may be associated with an overlapping portion of the sequential logical addresses of the memory system and a preceding sequence number group.

In some examples of the method 700 and the apparatus described herein, determining the physical address of the data set may include operations, features, circuitry, logic, means, or instructions for determining whether the logical address of the data set may be associated with the first sequential physical addresses or the preceding sequential physical addresses based at least in part on the logical address of the data set and the logical address of the last data set written at the memory system.

In some examples of the method 700 and the apparatus described herein, determining whether the logical address of the data set may be associated with the first sequential physical addresses or the preceding sequential physical addresses may include operations, features, circuitry, logic, means, or instructions for determining that the logical address of the data set may be associated with the first sequential physical addresses based at least in part on the logical address of the data set being smaller than the logical address of the last data set written at the memory system and determining that the logical address of the data set may be associated with the preceding sequential physical addresses based at least in part on the logical address of the data set being larger than the logical address of the last data set written at the memory system.

In some examples of the method 700 and the apparatus described herein, determining the physical address of the data set may include operations, features, circuitry, logic, means, or instructions for determining a block associated with the logical address of the data set based at least in part on determining that the logical address of the data set may be associated with the preceding sequential physical addresses and determining an offset within the block associated with a portion of the block that corresponds to the logical address of the data set.

In some examples of the method 700 and the apparatus described herein, determining the physical address of the data set may include operations, features, circuitry, logic, means, or instructions for determining, based at least in part on determining that the logical address of the data set may be associated with the first sequential physical addresses, a position of a prior write operation for the data set within a sequence of write operations for the plurality of data sets based at least in part on the sequence number group, a quantity of the sequential logical addresses, and the logical address of the data set and determining, based at least in part on determining that the logical address of the data set may be associated with the preceding sequential physical addresses, the position of a prior write operation for the data set within the sequence of write operations for the plurality of data sets based at least in part on the preceding sequence number group, the quantity of the sequential logical addresses, and the logical address of the data set.

In some examples of the method 700 and the apparatus described herein, determining the physical address of the data set may include operations, features, circuitry, logic, means, or instructions for determining a sequence number associated with the logical address of the data set based at least in part on a result of dividing the position of the prior write operation for the data set by a size of blocks of the memory system, the sequence number associated with a corresponding block of the memory system and determining, for the sequence number, an offset associated with the logical address of the data set based at least in part on a remainder resulting from dividing the position of the prior write operation for the data set by the size of the blocks of the memory system, the offset associated with a corresponding portion of the corresponding block that corresponds to the physical address of the data set.

In some examples of the method 700 and the apparatus described herein, and the method, apparatuses, and non-transitory computer-readable medium may include further operations, features, circuitry, logic, means, or instructions for generating, based at least in part on writing the respective portions of the plurality of data sets to the respective portions of the sequential physical addresses, respective sets of entries of a mapping corresponding to the respective portions of the sequential physical addresses.

In some examples of the method 700 and the apparatus described herein, the respective sets of entries may be associated with consecutive sets of the sequential logical addresses and respective blocks of the memory system, consecutive entries of the respective sets of entries may be associated with consecutive logical addresses of the sequential logical addresses, and each entry of the respective sets of entries may be associated with a position of a write operation for a respective data set within a sequence of write operations for the plurality of data sets.

In some examples of the method 700 and the apparatus described herein, the plurality of data sets may be stored in a first memory including not-AND memory cells, and.

In some examples of the method 700 and the apparatus described herein, the physical address of the data set may be determined without using a physical page table.

In some examples of the method 700 and the apparatus described herein, the sequence number group includes a group of blocks of the memory system sufficient to store respective data sets for each of the sequential logical addresses.

It should be noted that the methods described above describe possible implementations, and that the operations and the steps may be rearranged or otherwise modified and that other implementations are possible. Further, portions from two or more of the methods may be combined.

Another apparatus is described. The apparatus may include a memory device, a controller coupled with the memory device and configured to cause the apparatus to, receive a plurality of write commands for writing a plurality of data sets to a memory system, write, based at least in part on the plurality of write commands, the plurality of data sets to sequential physical addresses of the memory system that are associated with sequential logical addresses of the memory system, receive, based at least in part on writing the plurality of data sets to the sequential physical addresses, a read command for a data set of the plurality of data sets from a logical address of the sequential logical addresses, determine a physical address of the data set based at least in part on the logical address of the data set, a logical address of a last data set written at the memory system, and a sequence number group associated with the last data set written at the memory system, and read, based at least in part on the determining, the data set from the physical address of the memory system.

In some examples, to determine the physical address of the data set, the controller may be further configured to cause the apparatus to cause the apparatus to determine, based at least in part on the logical address and the sequence number group of the last data set written at the memory system, a sequence number associated with the logical address of the data set and associated with a corresponding block of the memory system and determine, for the sequence number, an offset associated with the logical address of the data set and associated with a corresponding portion of the corresponding block that corresponds to the physical address of the data set.

In some examples, the controller may be further configured to cause the apparatus to determine, based at least in part receiving the read command, the logical address of the last data set written at the memory system and a sequence number associated with the last data set written at the memory system and determine the sequence number group associated with the last data set written at the memory system based at least in part on the sequence number associated with the last data set written at the memory system and a quantity of the sequential logical addresses.

In some examples, to write the plurality of data sets, the controller may be further configured to cause the apparatus to write first data sets of the plurality of data sets to first sequential physical addresses of the sequential physical addresses that may be associated with the sequential logical addresses of the memory system and the sequence number group and write, before the first data sets, second data sets of the plurality of data sets to preceding sequential physical addresses of the sequential physical addresses that may be associated with an overlapping portion of the sequential logical addresses of the memory system and a preceding sequence number group.

In some examples, to determine the physical address of the data set, the controller may be further configured to cause the apparatus to determine whether the logical address of the data set may be associated with the first sequential physical addresses or the preceding sequential physical addresses based at least in part on the logical address of the data set and the logical address of the last data set written at the memory system.

In some examples, to determine the physical address of the data set, the controller may be further configured to cause the apparatus to determine a block associated with the logical address of the data set based at least in part on determining that the logical address of the data set may be associated with the preceding sequential physical addresses and determine an offset within the block associated with a portion of the block that corresponds to the logical address of the data set.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and a second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   receiving a plurality of write commands for writing a plurality of data sets to a memory system;
   writing, based at least in part on the plurality of write commands, the plurality of data sets to sequential physical addresses of the memory system that are associated with sequential logical addresses of the memory system;
   determining a sequence number group of a last data set written at the memory system based at least in part on writing the plurality of data sets to the sequential physical addresses;
   receiving, based at least in part on writing the plurality of data sets to the sequential physical addresses, a read command for a data set of the plurality of data sets from a logical address of the sequential logical addresses;
   determining a physical address of the data set based at least in part on the logical address of the data set, a logical address of the last data set written at the memory system, and the sequence number group of the last data set written at the memory system; and
   reading, based at least in part on the determining, the data set from the physical address of the memory system.

2. The method of claim 1, wherein determining the physical address of the data set comprises:
   determining, based at least in part on the logical address and the sequence number group associated with the last data set written at the memory system, a sequence number associated with the logical address of the data set and associated with a corresponding block of the memory system; and
   determining, for the sequence number, an offset associated with the logical address of the data set and associated with a corresponding portion of the corresponding block that corresponds to the physical address of the data set.

3. The method of claim 1, further comprising:
   determining, based at least in part receiving the read command, the logical address of the last data set written at the memory system and a sequence number associated with the last data set written at the memory system
   wherein determining the sequence number group of the last data set written at the memory system is based at least in part on the sequence number associated with the last data set written at the memory system and a quantity of the sequential logical addresses.

4. The method of claim 1, wherein determining the sequence number group of the last data set written at the memory system comprises:
   determining a quantity of blocks of the memory system for storing data for the sequential logical addresses based at least in part on a size of the blocks and the quantity of the sequential logical addresses,
   wherein the sequence number group of the last data set written at the memory system is based at least in part on a result of dividing a sequence number associated with the last data set written at the memory system by the quantity of the blocks.

5. The method of claim 1, wherein writing the plurality of data sets comprises:
   writing first data sets of the plurality of data sets to first sequential physical addresses of the sequential physical addresses that are associated with the sequential logical addresses of the memory system and the sequence number group; and writing, before the first data sets, second data sets of the plurality of data sets to preceding sequential physical addresses of the sequential physical addresses that are associated with an overlapping portion of the sequential logical addresses of the memory system and a preceding sequence number group.

6. The method of claim 5, wherein determining the physical address of the data set comprises:
determining whether the logical address of the data set is associated with the first sequential physical addresses or the preceding sequential physical addresses based at least in part on the logical address of the data set and the logical address of the last data set written at the memory system.

7. The method of claim 6, wherein determining whether the logical address of the data set is associated with the first sequential physical addresses or the preceding sequential physical addresses comprises:
determining that the logical address of the data set is associated with the first sequential physical addresses based at least in part on a value of the logical address of the data set being less than a value of the logical address of the last data set written at the memory system; or
determining that the logical address of the data set is associated with the preceding sequential physical addresses based at least in part on the value of the logical address of the data set being greater than the value of the logical address of the last data set written at the memory system.

8. The method of claim 6, wherein determining the physical address of the data set comprises:
determining a block associated with the logical address of the data set based at least in part on determining that the logical address of the data set is associated with the preceding sequential physical addresses; and
determining an offset within the block associated with a portion of the block that corresponds to the logical address of the data set.

9. The method of claim 6, wherein determining the physical address of the data set comprises:
determining, based at least in part on determining that the logical address of the data set is associated with the first sequential physical addresses, a position of a prior write operation for the data set within a sequence of write operations for the plurality of data sets based at least in part on the sequence number group, a quantity of the sequential logical addresses, and the logical address of the data set; or
determining, based at least in part on determining that the logical address of the data set is associated with the preceding sequential physical addresses, the position of the prior write operation for the data set within the sequence of write operations for the plurality of data sets based at least in part on the preceding sequence number group, the quantity of the sequential logical addresses, and the logical address of the data set.

10. The method of claim 9, wherein determining the physical address of the data set comprises:
determining a sequence number associated with the logical address of the data set based at least in part on a result of dividing the position of the prior write operation for the data set by a size of blocks of the memory system, the sequence number associated with a corresponding block of the memory system; and
determining, for the sequence number, an offset associated with the logical address of the data set based at least in part on a remainder resulting from dividing the position of the prior write operation for the data set by the size of the blocks of the memory system, the offset associated with a corresponding portion of the corresponding block that corresponds to the physical address of the data set.

11. The method of claim 1, wherein writing the plurality of data sets comprises writing respective portions of the plurality of data sets to respective portions of the sequential physical addresses, the respective portions of the sequential physical addresses corresponding to respective blocks of the memory system, wherein the method further comprises:
generating, based at least in part on writing the respective portions of the plurality of data sets to the respective portions of the sequential physical addresses, respective sets of entries of a mapping corresponding to the respective portions of the sequential physical addresses.

12. The method of claim 11, wherein:
the respective sets of entries are associated with consecutive sets of the sequential logical addresses and respective blocks of the memory system,
consecutive entries of the respective sets of entries are associated with consecutive logical addresses of the sequential logical addresses, and
each entry of the respective sets of entries is associated with a position of a write operation for a respective data set within a sequence of write operations for the plurality of data sets.

13. The method of claim 11, wherein:
the plurality of data sets is stored in a first memory comprising not-AND memory cells, and
the mapping is stored in a second memory comprising static random access memory cells.

14. The method of claim 1, wherein the physical address of the data set is determined without using a physical page table.

15. The method of claim 1, wherein the sequence number group comprises a group of blocks of the memory system sufficient to store respective data sets for each of the sequential logical addresses.

16. An apparatus, comprising:
a memory device; and
a controller coupled with the memory device and configured to cause the apparatus to:
receive a plurality of write commands for writing a plurality of data sets to a memory system;
write, based at least in part on the plurality of write commands, the plurality of data sets to sequential physical addresses of the memory system that are associated with sequential logical addresses of the memory system;
determine a sequence number group of a last data set written at the memory system based at least in part on writing the plurality of data sets to the sequential physical addresses;
receive, based at least in part on writing the plurality of data sets to the sequential physical addresses, a read command for a data set of the plurality of data sets from a logical address of the sequential logical addresses;
determine a physical address of the data set based at least in part on the logical address of the data set, a logical address of the last data set written at the memory system, and the sequence number group of the last data set written at the memory system; and
read, based at least in part on the determining, the data set from the physical address of the memory system.

17. The apparatus of claim 16, wherein, to determine the physical address of the data set, the controller is further configured to cause the apparatus to:
  determine, based at least in part on the logical address and the sequence number group associated with the last data set written at the memory system, a sequence number associated with the logical address of the data set and associated with a corresponding block of the memory system; and
  determine, for the sequence number, an offset associated with the logical address of the data set and associated with a corresponding portion of the corresponding block that corresponds to the physical address of the data set.

18. The apparatus of claim 16, wherein the controller is further configured to cause the apparatus to:
  determine, based at least in part receiving the read command, the logical address of the last data set written at the memory system and a sequence number associated with the last data set written at the memory system;
  wherein determining the sequence number group of the last data set written at the memory system is based at least in part on the sequence number associated with the last data set written at the memory system and a quantity of the sequential logical addresses.

19. The apparatus of claim 16, wherein, to write the plurality of data sets, the controller is further configured to cause the apparatus to:
  write first data sets of the plurality of data sets to first sequential physical addresses of the sequential physical addresses that are associated with the sequential logical addresses of the memory system and the sequence number group; and
  write, before the first data sets, second data sets of the plurality of data sets to preceding sequential physical addresses of the sequential physical addresses that are associated with an overlapping portion of the sequential logical addresses of the memory system and a preceding sequence number group.

20. The apparatus of claim 19, wherein, to determine the physical address of the data set, the controller is further configured to cause the apparatus to:
  determine whether the logical address of the data set is associated with the first sequential physical addresses or the preceding sequential physical addresses based at least in part on the logical address of the data set and the logical address of the last data set written at the memory system.

21. The apparatus of claim 20, wherein, to determine the physical address of the data set, the controller is further configured to cause the apparatus to:
  determine a block associated with the logical address of the data set based at least in part on determining that the logical address of the data set is associated with the preceding sequential physical addresses; and
  determine an offset within the block associated with a portion of the block that corresponds to the logical address of the data set.

22. A non-transitory computer-readable medium storing code comprising instructions which, when executed by a processor of an electronic device, cause the electronic device to:
  receive a plurality of write commands for writing a plurality of data sets to a memory system;
  write, based at least in part on the plurality of write commands, the plurality of data sets to sequential physical addresses of the memory system that are associated with sequential logical addresses of the memory system;
  determine a sequence number group of a last data set written at the memory system based at least in part on writing the plurality of data sets to the sequential physical addresses;
  receive, based at least in part on writing the plurality of data sets to the sequential physical addresses, a read command for a data set of the plurality of data sets from a logical address of the sequential logical addresses;
  determine a physical address of the data set based at least in part on the logical address of the data set, a logical address of the last data set written at the memory system, and the sequence number group of the last data set written at the memory system; and
  read, based at least in part on the determining, the data set from the physical address of the memory system.

23. The non-transitory computer-readable medium of claim 22, wherein, to determine the physical address of the data set, the instructions, when executed by the processor of the electronic device, further cause the electronic device to:
  determine, based at least in part on the logical address and the sequence number group associated with the last data set written at the memory system, a sequence number associated with the logical address of the data set and associated with a corresponding block of the memory system; and
  determine, for the sequence number, an offset associated with the logical address of the data set and associated with a corresponding portion of the corresponding block that corresponds to the physical address of the data set.

24. The non-transitory computer-readable medium of claim 22, wherein the instructions, when executed by the processor of the electronic device, further cause the electronic device to:
  determine, based at least in part receiving the read command, the logical address of the last data set written at the memory system and a sequence number associated with the last data set written at the memory system
  wherein determining the sequence number group of the last data set written at the memory system is based at least in part on the sequence number associated with the last data set written at the memory system and a quantity of the sequential logical addresses.

25. The non-transitory computer-readable medium of claim 22, wherein, to write the plurality of data sets, the instructions, when executed by the processor of the electronic device, further cause the electronic device to:
  write first data sets of the plurality of data sets to first sequential physical addresses of the sequential physical addresses that are associated with the sequential logical addresses of the memory system and the sequence number group; and
  write, before the first data sets, second data sets of the plurality of data sets to preceding sequential physical addresses of the sequential physical addresses that are associated with an overlapping portion of the sequential logical addresses of the memory system and a preceding sequence number group.

* * * * *